United States Patent
Vassallo et al.

(10) Patent No.: US 11,098,676 B1
(45) Date of Patent: Aug. 24, 2021

(54) RADIAL LIP PISTON PROFILE FOR EASY FORGEABILITY

(71) Applicant: GM GLOBAL TECHNOLOGY OPERATIONS LLC, Detroit, MI (US)

(72) Inventors: Alberto Lorenzo Vassallo, Turin (IT); Francesco Concetto Pesce, Turin (IT); Michele Dematteis, Pinerolo (IT); Fabio Numidi, Agliè (IT); Andrea Tripodi, Genoa (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/026,732

(22) Filed: Sep. 21, 2020

(51) Int. Cl.
 F02F 3/00 (2006.01)
 F02F 3/26 (2006.01)
 F02B 23/06 (2006.01)

(52) U.S. Cl.
 CPC ............ F02F 3/26 (2013.01); F02B 23/0696 (2013.01)

(58) Field of Classification Search
 CPC .............. F02B 23/0651; F02B 23/0696; F02B 23/0672; F02B 23/0678; F02B 23/0624; F02B 23/0621
 USPC ...................................................... 123/193.6
 See application file for complete search history.

(56) References Cited

U.S. PATENT DOCUMENTS

| | | | | |
|---|---|---|---|---|
| 5,215,052 | A * | 6/1993 | Augustin | F02B 23/0669 123/276 |
| 9,909,489 | B1 * | 3/2018 | Koci | F02B 23/0648 |
| 10,738,682 | B2 * | 8/2020 | Eismark | F02B 23/0651 |
| 2011/0253094 | A1 * | 10/2011 | Rothbauer | F02B 23/0621 123/276 |
| 2011/0253095 | A1 * | 10/2011 | Rothbauer | F02B 23/0627 123/276 |
| 2011/0271931 | A1 * | 11/2011 | Rothbauer | F02B 23/0636 123/279 |
| 2015/0159584 | A1 * | 6/2015 | Janssen | F02F 3/0015 29/888.07 |
| 2018/0238264 | A1 * | 8/2018 | Vassallo | F02B 23/0672 |
| 2018/0283315 | A1 * | 10/2018 | John | F02B 23/0651 |
| 2019/0186342 | A1 * | 6/2019 | Zoeller | F02M 61/1806 |
| 2019/0360428 | A1 * | 11/2019 | Kanzaki | F02B 23/0669 |
| 2020/0095922 | A1 | 3/2020 | Vassallo et al. | |

\* cited by examiner

*Primary Examiner* — Long T Tran
*Assistant Examiner* — James J Kim
(74) *Attorney, Agent, or Firm* — Harness, Dickey & Pierce, P.L.C.

(57) ABSTRACT

A piston for an internal combustion engine includes a piston body having a generally planar crown and a sidewall extending from the crown. A stepped combustion bowl is recessed in the crown and includes an outer bowl recessed relative to the crown and defining a generally planar annular floor surface. The stepped combustion bowl further includes an inner bowl recessed relative to the outer bowl. The inner bowl includes a sidewall that slopes continually inwardly from the outer bowl to a floor surface of the inner bowl. A plurality of protruding lips extend from the sidewall toward a central axis of the piston body.

11 Claims, 2 Drawing Sheets

RADIAL LIP PISTON PROFILE FOR EASY FORGEABILITY

FIELD

The present disclosure relates to a piston for an internal combustion engine, and more particularly, to a piston with an improved radial lip profile for improved emissions, improved efficiency and higher power output.

BACKGROUND

This section provides background information related to the present disclosure which is not necessarily prior art.

It is known in the art relating to diesel engines that governmental emissions regulations require improvements in engine design in order to reduce emissions to meet or exceed these regulations. For example, enhanced air system designs could provide higher rates of cooled EGR (exhaust gas recirculation), thereby reducing $NO_x$ emissions, while enhanced fuel injection systems could reduce the inevitably higher soot emissions that would result from the use of higher EGR rates. Also, combined soot and $NO_x$ emissions after treatment systems could reduce emissions from diesel engines. Exhaust after treatment systems, however, can be costly and therefore are not the most desirable means of achieving emissions reductions.

In contrast, advancements in the combustion system design could reduce emissions while minimizing the need for costly and unproven diesel exhaust after treatment systems. Further, fuel economy, exhaust emissions, and performance of diesel combustion systems are greatly affected by the design of the engine's piston, as well as by the choice of fuel injection and air handling equipment (e.g., turbocharger, EGR system, etc.). Therefore, improvements in diesel engine piston design could advantageously lead to lower emissions without significant increases in cost.

SUMMARY

This section provides a general summary of the disclosure, and is not a comprehensive disclosure of its full scope or all of its features.

The present invention provides an improved diesel engine combustion bowl design that allows for enhanced mixing of combustion products with excess air available in the cylinder, simultaneously reducing soot and $NO_x$ emissions. More particularly, the present invention provides a piston having an improved stepped bowl design. The improved stepped bowl design leads to a reduction in the production of $NO_x$ gases. The present disclosure also achieves superior trade-offs of soot (i.e., particulate matter) vs. $NO_x$ emissions and fuel consumption vs. $NO_x$ emissions.

According to the present disclosure, a piston includes a piston body having a generally planar crown and a sidewall extending from the crown. A stepped combustion bowl recessed in the crown, the stepped combustion bowl including an outer bowl recessed relative to the crown and defining a generally planar annular floor surface, the stepped combustion bowl including an inner bowl recessed relative to the outer bowl, the inner bowl having a sidewall that slopes continually inwardly from the outer bowl to a floor surface of the inner bowl and a plurality of protruding lips extending from the sidewall toward a central axis of the piston body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
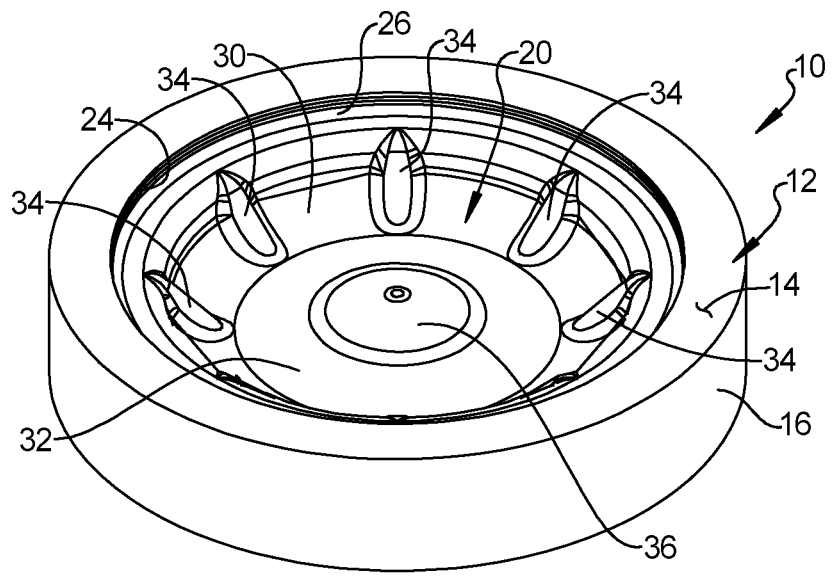
FIG. 1 is a perspective view of the piston according to the principles of the present disclosure.
Figure 2:
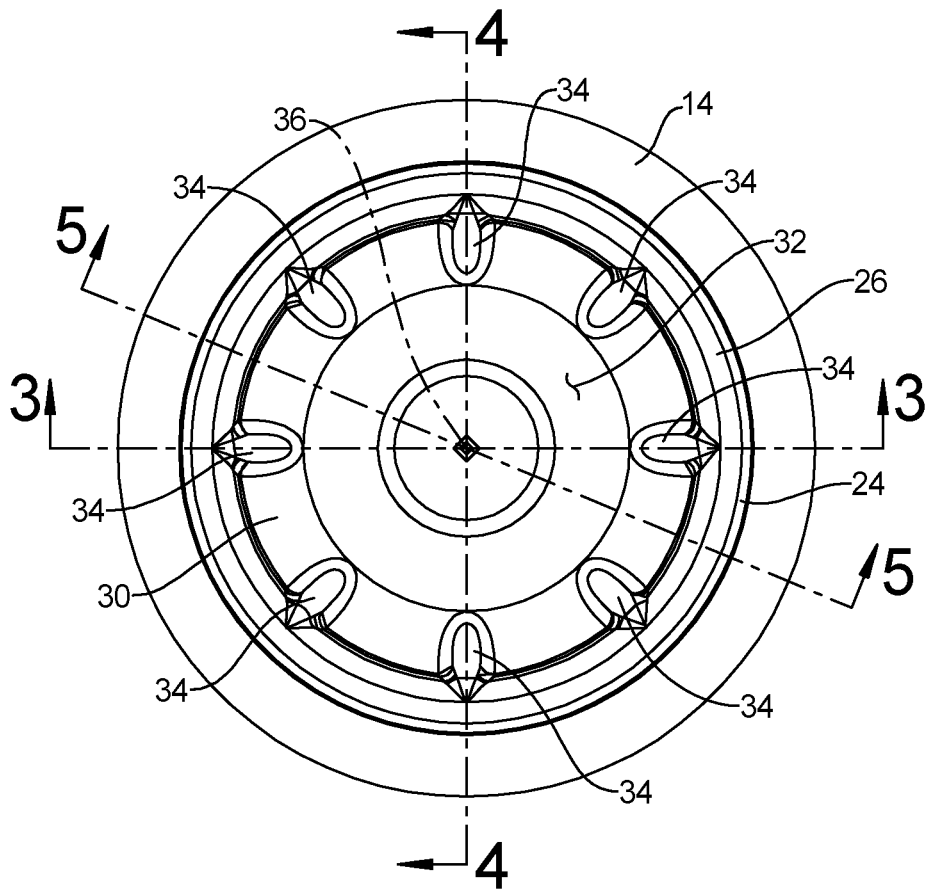
FIG. 2 is a top plan view of the piston shown in FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a piston 10 is shown including a piston body 12 having a crown 14 and a ring belt 16 extending from the crown 14. The ring belt 16 can include one or more piston ring grooves (not shown). The crown 14 defines a generally planar surface and includes a stepped combustion bowl 20 recessed from the crown 14.

Figure 3:
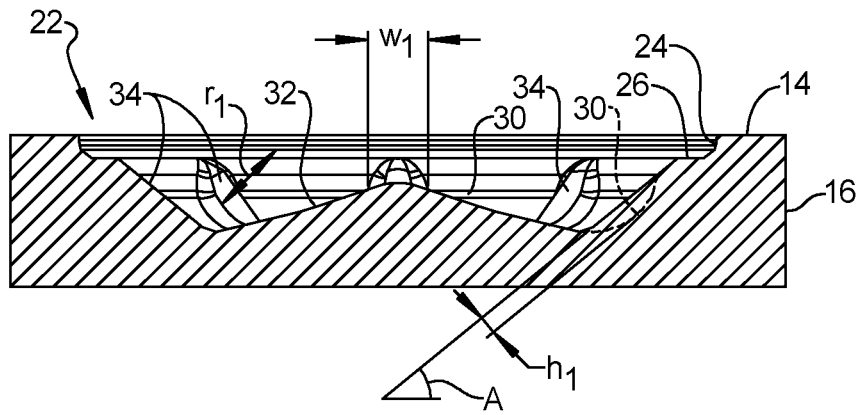
FIG. 3 is a cross-section of the piston taken along line 3-3 of FIG. 2.
Figure 4:
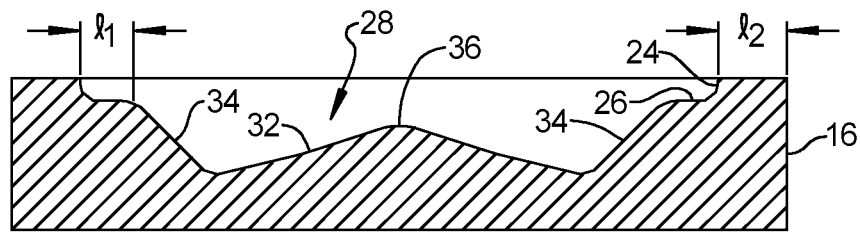
FIG. 4 is a cross-section of the piston radial lip profile taken along line 4-4 of FIG. 2.
Figure 5:
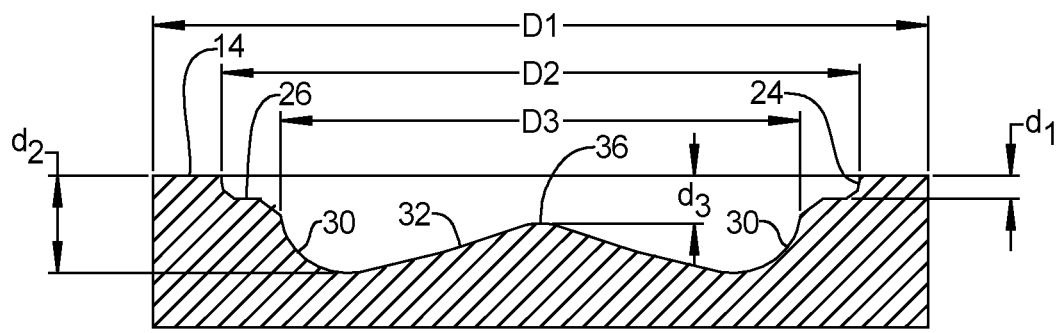
FIG. 5 is a cross section of the piston radial lip profile taken along line 5-5 of FIG. 2.

With reference to the cross-section of FIGS. 3-5, the stepped combustion bowl 20 includes an outer bowl 22 having an outer sidewall 24 extending from the crown 14. The outer bowl 22 includes an annular floor surface 26 that is generally planar. The stepped combustion bowl 20 further includes an inner bowl 28 having an outer sidewall 30 (best shown in FIGS. 3 and 5) extending from the annular floor surface 26 of the outer bowl 22. The outer side wall 30 of the inner bowl 28 is sloped continually inwardly from the annular floor surface 26 to a floor surface 32 of the inner bowl 28. A plurality of protruding ribs 34 extend from the outer side wall 30 of the inner bowl 28 toward a center axis of the piston body 12. The protruding ribs 34 also transition smoothly and directly from the annular floor surface 26 of the outer bowl 22 to an approximate low point of the floor of the inner bowl 28. The floor surface 32 of the inner bowl 28 has a mounded center region 36.

With reference to FIG. 5, an exemplary piston according to the principles of the present disclosure can have an outer diameter D1 of 103 mm with the stepped combustion bowl having a diameter D2 of 84 mm. A diameter D3 of the beginning of the inner bowl is 69 mm. A depth d1 of the outer bowl 22 can be 3 mm and a maximum depth d2 of the inner bowl 28 can be 12.7 mm with the mounded central region having a depth d3 of 6.25 mm.

With reference to FIG. 4, a radial length l1 of the outer bowl 22 can be 7.5 mm and a radial length l2 of the crown can be 9.5 mm. The protrusion height h1 of the plurality of lips 34 can be 2.68 mm and a width w1 of the plurality of lips 34 can be 3.6 mm. As shown in FIG. 3, the radius r1 of the plurality of lips 34 can be 4 mm and the lips can be inclined at an angle A of between 42-48° and more particularly 45° for the example provided.

Although the above dimensions are provided for a specific example embodiment, the following dimensional relationships are provided for a range of different sized pistons. The proportion of the radial length l1 of the outer bowl 22 to the radial length l2 of the crown surface 14 can be between 70 and 80%, and more particularly 78.9% for the example provided. The proportion of the radial length l1 of the outer bowl 22 to the step depth d1 of the outer bowl 22 can be between 200-300%, and more particularly 250% for the example provided. The proportion of the radial length l1 to the bore diameter D1 can be between 5-10%, and more particularly 7.3% for the example provided. The proportion of the radial length l1 of the outer bowl 22 to the mound depth d3 from the crown surface 14 to the tip of the mounded center region 36 can be between 100-150%, and more particularly 120% for the example provided. The proportion of the radial length l1 of the outer bowl 22 to the maximum bowl depth d2 can be between 40-70%, and more particularly 48% for the example provided.

The proportion of the outer bowl depth d1 to the mound depth d3 from the crown surface 14 to the tip of the mounded center region 36 can be between 30-60%, and more particularly 48% for the example provided. The proportion of the outer bowl depth d1 to the maximum bowl depth d2 can be between 10-30%, and more particularly 23.6% for the example provided. The proportion of the outer bowl depth d1 to the bore diameter D1 can be between 1-5%, and more particularly 2.9% for the example provided. The proportion of the maximum bowl depth d2 to the bore diameter D1 can be between 10-20%, and more particularly 12.3% for the example provided. The proportion of the diameter D2 of the outer bowl to the bore diameter D1 can be between 70-90%, and more particularly 81% for the example provided. The proportion of the diameter D3 of the inner bowl to the bore diameter D1 can be between 60-80%, and more particularly 67% for the example provided. The proportion of the diameter D3 of the inner bowl to the outer bowl diameter D2 can be between 70-90%, and more particularly 82.1% for the example provided.

The proportion of the radial length l1 of the outer bowl to the outer bowl diameter D2 can be between 5-10%, and more particularly 8.9% for the example provided. The proportion of the radial length l1 of the outer bowl to the diameter D3 of the inner bowl can be between 5-15%, and more particularly 10.9% for the example provided. The proportion of the radial length l2 of the crown 14 to the outer bowl diameter D2 can be between 5-15%, and more particularly 11.3% for the example provided. The proportion of the radial length l2 of the crown 14 to the diameter D3 of the inner bowl can be between 10-20%, and more particularly 13.8% for the example provided. The proportion of the height of the lip protrusion h1 to the width of the lip protrusions w1 can be between 60-100%, and more particularly 74.4% for the example provided.

Usage of radial lips in a combustion bowl in a diesel engine can bring big advantages in reducing smoke and enhancing efficiency. Such benefits are strongly increased when coupled with an inner bowl with a sharp-step feature. The proposed design embeds a sharp-stepped bowl design with radial lips in a forgeable way without deteriorating thermodynamics.

The design of the present disclosure breaks a classic diesel conundrum between achieving high efficiency vs low emissions (PM and NOx) and provides a cost-effective solution possible with standard manufacturing processes.

The present disclosure eliminates high part costs of a previous sharp-stepped combustion bowl with radial lips that require 5 axes CNC machining needed on aluminum and steel pistons.

The combustion bowl template design of the present disclosure effectively combines the sharp step and the radial lips features in a new way with no undercuts to provide a bowl profile that is suitable for forging or machining without 5-axes CNC machining.

The radial lip details (protrusion distance, thickness and rounding) are 'smooth enough' in order to be compliant with forging tools and with minimum deterioration of thermodynamics properties.

The combustion bowl can be forged in a single piece and then welded to a base piston keeping accurate radial lips indexing with nozzle sprays, and with competitive piston compression/oil gallery height and overall weight.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A piston for an internal combustion engine, comprising:
   a piston body having a generally planar crown and a sidewall extending from the crown;
   a stepped combustion bowl recessed in the crown, the stepped combustion bowl including an outer bowl recessed relative to the crown and defining a generally planar annular floor surface, the stepped combustion bowl including an inner bowl recessed relative to the outer bowl, wherein a proportion of a radial length l1 of the outer bowl to a radial length l2 of the crown surface is between 70 and 80%, the inner bowl having a sidewall that slopes continually inwardly from the outer bowl to a floor surface of the inner bowl and a plurality of protruding lips extending from the sidewall toward a central axis of the piston body, wherein the plurality of protruding lips transition smoothly and directly from the annular floor surface of the outer bowl and extend to a floor surface of the inner bowl and wherein a majority of a length of the plurality of protruding lips are inclined relative to a central axis of the piston body by an angle of between 42° and 48°.

2. The piston of claim 1, wherein each of the plurality of protruding lips are equally spaced about the central axis.

3. The piston of claim 2, wherein the plurality of protruding lips includes at least seven and fewer than eleven protruding lips.

4. The piston of claim 1, wherein the inner floor surface of the inner bowl has a mounded center region.

5. The piston of claim 1, wherein the plurality of protruding lips are inclined relative to the central axis by 45°.

6. A piston for an internal combustion engine, comprising:
   a piston body having a generally planar crown and a sidewall extending from the crown;
   a stepped combustion bowl recessed in the crown, the stepped combustion bowl including an outer bowl recessed relative to the crown and defining a generally planar annular floor surface, the stepped combustion bowl including an inner bowl recessed relative to the outer bowl, the inner bowl having a sidewall that slopes continually inwardly from the outer bowl to a floor surface of the inner bowl and a plurality of protruding lips extending from the sidewall toward a central axis of the piston body, wherein the plurality of protruding lips transition smoothly and directly from the annular floor surface of the outer bowl, wherein the plurality of protruding lips extend to a floor surface of the inner bowl wherein a majority of a length of the plurality of protruding lips are inclined relative to a central axis of the piston body by an angle of between 42° and 48°.

7. The piston of claim 6, wherein each of the plurality of protruding lips are equally spaced about the central axis.

8. The piston of claim 7, wherein the plurality of protruding lips includes at least seven and fewer than eleven protruding lips.

9. The piston of claim 6, wherein the inner floor surface of the inner bowl has a mounded center region.

10. The piston of claim 6, wherein the plurality of protruding lips are inclined relative to the central axis by 45°.

11. The piston of claim 6, wherein a proportion of a radial length l1 of the outer bowl to a radial length l2 of the crown surface is between 70 and 80%.

* * * * *